(12) United States Patent
Kerger et al.

(10) Patent No.: US 6,367,500 B1
(45) Date of Patent: Apr. 9, 2002

(54) SAFETY VALVE FOR A COMPRESSED-GAS TANK

(75) Inventors: Léon Kerger, Helmdange; Jean-Claude Schmitz, Heisdorf, both of (LU)

(73) Assignee: Luxembourg Patent Company, S.A. (LU)

( * ) Notice: Subject to any disclaimer, the term of this patent is extended or adjusted under 35 U.S.C. 154(b) by 0 days.

(21) Appl. No.: 09/611,836

(22) Filed: Jul. 7, 2000

(30) Foreign Application Priority Data

Jul. 14, 1999 (LU) .................................................. 90414

(51) Int. Cl.$^7$ .............................................. F16K 17/40
(52) U.S. Cl. .......................................... 137/79; 137/74
(58) Field of Search ............................. 137/72, 74, 79; 220/89.4

(56) References Cited

U.S. PATENT DOCUMENTS

| | | | | |
|---|---|---|---|---|
| 1,944,518 A | * | 1/1934 | Lovekin et al. ................ 137/53 |
| 3,896,835 A | * | 7/1975 | Wicke et al. .................. 137/75 |
| 4,365,643 A | * | 12/1982 | Masclet et al. ................ 137/70 |
| 4,535,957 A | * | 8/1985 | Bischoff et al. ........ 244/103 R |
| 4,922,944 A | * | 5/1990 | Mueller et al. ................ 137/72 |
| 5,592,962 A | * | 1/1997 | Hooberman ............. 137/68.22 |
| 5,954,081 A | * | 9/1999 | Everhard et al. ........ 137/68.23 |

FOREIGN PATENT DOCUMENTS

DE 2744898 * 4/1979 .................. 137/72

* cited by examiner

*Primary Examiner*—Michael Powell Buiz
*Assistant Examiner*—Meredith H. Schoenfeld
(74) *Attorney, Agent, or Firm*—Leydig, Voit & Mayer, Ltd

(57) ABSTRACT

A safety valve for a compressed gas tank in which the plug is made of meltable material and intended to melt at a pre-determined temperature in order to release the compressed gas from the tank. The safety valve is essentially characterized in that the meltable plug is subjected to the action of a differential action sliding piston intended for reducing at least some of the effect of the gas pressure on the meltable plug.

18 Claims, 1 Drawing Sheet

SAFETY VALVE FOR A COMPRESSED-GAS TANK

FIELD OF THE INVENTION

The present invention relates to a safety valve for a compressed-gas tank, the said valve comprising a plug made of meltable material and intended to melt at a predetermined temperature in order to release the compressed gas from the tank.

BACKGROUND OF THE INVENTION

Such safety valves are used to prevent the risk of the tank exploding when the temperature exceeds a predetermined limit. In fact, at this temperature, which may be of the order of 100° C., the plug mentioned in the introduction melts and allows the gases and excess pressure to escape. Below this critical temperature, the plug must normally remain solid and prevent any leakage of pressure and gas.

Unfortunately, the situation was found where the plug melts prematurely, that is to say at temperatures below its melting temperature. It was found that these instances occur when the gas is stored at high pressures and when this melting is caused not by the temperature, but by the pressure. It was discovered, in fact, that if such a plug is exposed to high pressures for a relatively long time, it may become deformed and even melt and thus release the gases below the melting temperature. There is therefore an unintentional leakage, along with the risk of an accident and risks to the environment. Moreover, the material of the plug to be replaced is extremely costly.

SUMMARY OF THE INVENTION

The object of the present invention is to provide a new safety valve which makes it possible to avoid these disadvantages, that is to say a valve, the plug of which does not risk melting prematurely under the effect of prolonged pressure.

In order to achieve this object, the invention provides a safety valve of the type described in the introduction, which is essentially characterized in that the meltable plug is subjected to the action of a differential-action sliding piston intended for. educing at least some of the effect of the gas pressure on the meltable plug.

According to a preferred embodiment, the valve comprises a housing integral with the tank and comprising a first cylindrical part open towards the outside of the tank and a second cylindrical part with a closed bottom, having a diameter smaller than that of the first cylindrical part and communicating through its side wall with the interior of the tank, and a bush which is fastened inside the first cylindrical part and the orifice of which faces the second cylindrical part, the bush containing the meltable plug which is retained there by means of a rod integral with the said differential-action piston which is located in the said second cylindrical part. The said differential-action piston is preferably a double-action piston comprising two pistons connected by means of an axial rod, the first piston normally being located at the bottom of the second cylindrical part and the second piston normally being located between the first and the second cylindrical part in order to ensure sealing between these parts, the diameter of the latter piston being greater than the diameter of the first piston.

The effect of the gas pressure on the second piston consequently generates a thrust on the meltable plug, the said thrust being proportional to the pressure of the gas and to the exposed surface of the second piston. By contrast, the first piston, which is likewise exposed to the pressure of the gas, acts in the opposite direction, that is to say its effect is subtracted from the thrust exerted by the second piston on the meltable plug. Finally, the latter undergoes only a force proportional to the difference in the areas of the two pistons. The plug consequently undergoes only a slight pressure and does not risk being damaged prematurely under the effect of a high and prolonged pressure.

BRIEF DESCRIPTION OF THE DRAWINGS

Other particular features of the present invention will be gathered from the description of an advantageous embodiment given below by way of illustration, with reference to the accompanying single figure.

DETAILED DESCRIPTION OF THE INVENTION

Figure 1:
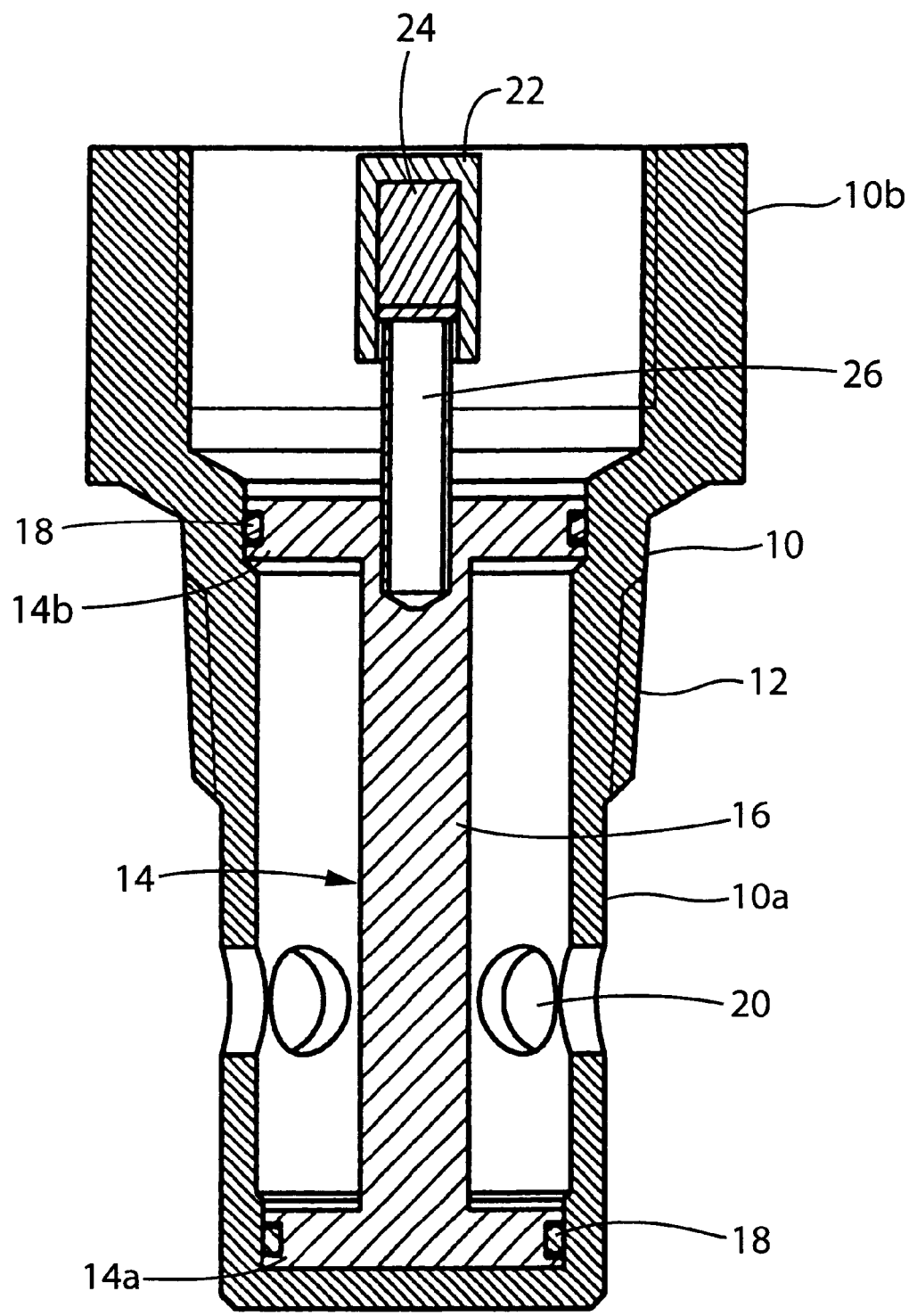
FIG. 1 which is a view in vertical section through a safety valve according to the present invention.

This safety valve comprises a housing 10 with an external thread 12 allowing the valve to be screwed into the wall, not shown, of a tank containing compressed gas. The housing comprises an upper part 10b, facing outwards when the valve is mounted on the tank, and a lower part 10a penetrating into the tank.

The lower part 10a of the housing 10 is a cylinder with a closed bottom, containing a differential-action piston 14 which consists of a first piston 14a normally located at the bottom of the lower cylindrical part 10a and a second piston 14b normally located in the neck between the two parts 10a and 10b. The two pistons 14a and 14b, which are connected to one another by means of an axial rod 16, each carry a peripheral seal 18 ensuring sealing relative to the wall of the lower part of the housing 10. The second piston 14b is therefore the member for closing the valve and ensures sealing between the interior of the tank and the exterior.

The wall of the housing 10a comprises a series of orifices 20, so that the pressure in the housing 10a corresponds to the pressure in the tank, that is to say this pressure can be exerted in full on each of the pistons 14a and 14b.

According to one of the particular features of the present invention, the diameter of the first piston 14a is slightly smaller than that of the second piston 14b. It is therefore necessary for the inside diameter of the wall of the housing 10a to be greater, at the level of the piston 14b, than the inside diameter in the bottom of the housing 10a.

The upper and outer part 10b of the housing 10 has an inside diameter which is substantially greater than the diameter of the upper piston 14b.

In the upper part 10b of the housing is located an upturned bush 22, hence with an open bottom, which contains a plug 24 made of meltable material melting at a predetermined critical temperature, for example approximately 100° C. The bush 22 is made integral with the wall of the upper part 10b of the housing 10 by means not shown, for example by means of spokes.

The outer part of the piston 14b carries an axial rod 26 which extends in the upper part 10b of the housing 10 and penetrates into the bush 22 up to contact with the plug 24. This rod 26 has a diameter slightly smaller than the inside diameter of the bush 22.

During normal operation, the valve occupies the position shown in the figure. The plug 24 is solid and, under the effect of the rod 26 and by virtue of the connection, not shown, between the bush 22 and the housing 10b, retains the piston 14 in the position shown. Consequently, the piston 14b, by virtue of its peripheral seal 18, prevents any leakage of gas towards the outside. Moreover, since the gas pressure acts both on the piston 14a and on the piston 14b, the plug 24 undergoes only a slight thrust by the rod 26, the said thrust being proportional to the difference in radial area between the two pistons 14a and 14b.

When, for one reason or another, the bush 22 and the plug 24 are exposed to an abnormal temperature exceeding the critical melting temperature of the plug 24 and capable of putting the tank at risk of explosion, the plug 24 melts and its liquid material flows out of the bush 22 around the rod 26. With the bush 22 empty, the rod 26 no longer encounters any resistance and the lift acting on the piston 14 under the effect of the differential pressure is sufficient to raise the piston 14 and cause the piston 14b to penetrate into the upper part 10b of the widened diameter housing. Here, the piston 14b no longer ensures any sealing relative to the outer surface and the compressed gases can from that moment escape freely from the tank.

In order to prevent an accumulation of gas between the bottom of the housing 10a and the bottom of the piston 14a from occurring progressively as a result of damage to the seal 18 of the piston 14b, it is possible to ventilate this zone by providing, through the entire piston 14, a thin axial duct which issues into the open chamber of the housing 10b.

Since the meltable material of the plug 24 is usually based on welding tin, such as the material for solders, it is possible to provide a variant for the plug 24. This variant would involve providing, instead of the upwardly closed bush 22, a tube open at both ends and producing the head of the rod from solder or meltable metal which would be welded to this tube in order to withstand the differential pressure on the piston 14. At the critical temperature, this weld would melt and would allow the rod 26 to slide through the tube and thus open the valve.

What is claimed is:

1. Safety valve for a compressed-gas tank, comprising a plug (24) made of meltable material and adapted to melt at a predetermined temperature in order to release the compressed gas from the tank, characterized in that the meltable plug (24) is subjected to the action of a differential-action sliding piston (14) reducing at least some of the effect of the gas pressure on the meltable plug (24) by having compressed gas act on opposing piston faces of the differential action sliding piston when the safety valve is closed.

2. The safety valve of claim 1 wherein the differential-action sliding piston (14) includes first and second pistons (14a, 14b) in spaced apart relation connected by a rod (16) therebetween to provide a region of the compressed gas around the rod (16) acting upon the opposing faces of the first and second pistons (14a, 14b).

3. The safety valve of claim 3 wherein the first and second pistons (14a, 14b) are of different diameters to provide different surface areas among the opposing piston faces, the different diameters being selected to selectively reduce the effect of the gas pressure on the meltable plug (24).

4. The safety valve of claim 3 further comprising a valve housing 10 having a cylindrical chamber with first and second portions (10a, 10b) of different diameters corresponding to the different diameters of the first and second pistons (14a, 14b), the first piston (14a) sliding against the first portion (10a) of the cylindrical chamber and the second piston (14b) sliding against the second portion (10b) of the cylindrical chamber.

5. The safety valve of claim 4 wherein the housing has a closed end enclosing one end of the cylindrical chamber and receiving the first piston (14a), further comprising orifices (20) in the valve housing (10) arranged between the first and second pistons for communicating the gas pressure to the region around the rod (16).

6. The safety valve of claim 5 wherein the first piston (14a) comprises a first seal (18) fluidically separating the region around the rod (16) from the closed end.

7. The safety valve of claim 6 wherein the second piston (14b) comprises a second seal (18) sealing against the valve housing (10) to prevent escape of compressed gas from the compressed-gas tank.

8. The safety valve of claim 1 further comprising valve housing (10) secured to the compressed-gas tank; and a bush (22) supported by the valve housing (10) outside of the compressed-gas tank, the bush (22) containing the meltable plug (24), further comprising an actuating rod (26) projecting from the differential-action sliding piston (14), the meltable plug (24) axially supporting the differential-action sliding piston (14) through the actuating rod (26) against the action of compressed gas acting on the differential-action sliding piston (14) to keep the safety valve closed.

9. The safety valve of claim 1 further comprising a valve housing (10), the differential action sliding piston (14) sliding in the valve housing (10), further comprising a bush (22) secured to the valve housing (10), the bush (22) containing the meltable plug (24).

10. Safety valve for a compressed-gas tank, comprising a plug (24) made of meltable material and intended to melt at a predetermined temperature in order to release the compressed gas from the tank, characterized in that the meltable plug (24) is subjected to the action of a differential-action sliding piston (14) intended for reducing at least some of the effect of the gas pressure on the meltable plug (24) characterized in that it comprises a housing (10) integral with the tank and comprising a first cylindrical part (10b) open towards the outside of the tank and a second cylindrical part (10a) with a closed bottom, having a diameter smaller than that of the first cylindrical part (10b) and communicating through its side wall with the interior of the tank, and a bush (22) which is fastened inside the first cylindrical part (10b) and the orifice of which faces the second cylindrical part (10a), the bush containing the meltable plug (24) which is retained there by means of a rod (26) integral with the said differential-action piston (14) which is located in the said second cylindrical part (10a), and in that the said differential-action piston (14) is a double-action piston comprising two pistons connected by means of an axial rod (16), the first piston (14a) normally being located at the bottom of the second cylindrical part (10a) and the second piston (14b) normally being located between the first and the second cylindrical part in order to ensure sealing between these parts, the diameter of the second piston (14b) being greater than the diameter of the first piston (14a).

11. Safety valve for a compressed-gas tank, comprising a plug (24) made of meltable material and adapted to melt at a predetermined temperature in order to release the compressed gas from the tank, characterized in that the meltable plug (24) is subjected to the action of a differential-action sliding piston (14) reducing at least some of the effect of the gas pressure on the meltable plug (24), further comprising an actuating rod (26) projecting from the differential-action sliding piston (14), the meltable plug (24) axially supporting the differential-action sliding piston (14) through the actuating rod (26) against the action of compressed gas acting on the differential-action sliding piston (14) to keep the safety valve closed.

12. The safety valve of claim 11 wherein the differential-action sliding piston (14) includes first and second pistons (14a, 14b) in spaced apart relation connected by a rod (16) therebetween to provide a region of the compressed gas around the rod (16) acting upon the opposing faces of the first and second pistons (14a, 14b).

13. The safety valve of claim 12 wherein the first and second pistons (14a, 14b) are of different diameters to provide different surface areas among the opposing piston faces, the different diameters being selected to selectively reduce the effect of the gas pressure on the meltable plug (24).

14. The safety valve of claim 13 further comprising a valve housing 10 having a cylindrical chamber with first and second portions (10a, 10b) of different diameters corresponding to the different diameters of the first and second pistons (14a, 14b), the first piston (14a) sliding against the first portion (10a) of the cylindrical chamber and the second piston (14b) sliding against the second portion (10b) of the cylindrical chamber.

15. The safety valve of claim 14 wherein the housing has a closed end enclosing one end of the cylindrical chamber and receiving the first piston (14a), further comprising orifices (20) in the valve housing (10) arranged between the first and second pistons for communicating the gas pressure to the region around the rod (16).

16. The safety valve of claim 15 wherein the first piston (14a) comprises a first seal (18) fluidically separating the region around the rod (16) from the closed end.

17. The safety valve of claim 16 wherein the second piston (14b) comprises a second seal (18) sealing against the valve housing (10) to prevent escape of compressed gas from the compressed-gas tank.

18. The safety valve of claim 11 further comprising a valve housing (10), the differential action sliding piston (14) sliding in the valve housing (10), further comprising a bush (22) secured to the valve housing (10), the bush (22) containing the meltable plug (24).

* * * * *